United States Patent
Bolte et al.

(10) Patent No.: US 9,471,366 B2
(45) Date of Patent: *Oct. 18, 2016

(54) VIRTUAL MACHINE DISK IMAGE BACKUP USING BLOCK ALLOCATION AREA

(71) Applicant: International Business Machines Corporation, Armonk, NY (US)

(72) Inventors: Dirk Bolte, Birkenfeld (DE); Marco Kraemer, Boeblingen (DE); Jakob C. Lang, Boeblingen (DE); Angel Nunez Mencias, Boeblingen (DE); Thomas Pohl, Boeblingen (DE); Martin Troester, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/929,357

(22) Filed: Nov. 1, 2015

(65) Prior Publication Data
US 2016/0055027 A1 Feb. 25, 2016

Related U.S. Application Data

(63) Continuation of application No. 14/198,722, filed on Mar. 6, 2014.

(30) Foreign Application Priority Data

Mar. 18, 2013 (GB) .................................. 1304912.7

(51) Int. Cl.
*G06F 9/455* (2006.01)
*G06F 3/06* (2006.01)
*G06F 17/30* (2006.01)

(52) U.S. Cl.
CPC ............. *G06F 9/45558* (2013.01); *G06F 3/06* (2013.01); *G06F 17/30* (2013.01); *G06F 2009/45579* (2013.01)

(58) Field of Classification Search
None
See application file for complete search history.

(56) References Cited

U.S. PATENT DOCUMENTS

| 7,246,200 B1 * | 7/2007 | van Rietschote ..... G06F 9/4403 709/220 |
| 7,647,468 B2 | 1/2010 | Leis et al. |

(Continued)

FOREIGN PATENT DOCUMENTS

FR 2947926 A1 1/2011

OTHER PUBLICATIONS

Jianxin Li et al., "iROW: An Efficient Live Snapshot System for Virtual Machine Disk," 2012 IEEE 18th International Conference on Parallel and Distributed Systems, IEEE Computer Science, 2012.

*Primary Examiner* — Benjamin Wu
(74) *Attorney, Agent, or Firm* — Roy W. Truelson; James R. Nock (57) ABSTRACT

The invention relates to a method for managing virtual machine image disk usage comprising a disk image emulator for a virtual machine provided by a hypervisor, comprising the steps of providing at least a first disk image comprising a sequence of data blocks for accumulating write operations to the first disk image, providing at least a second disk image comprising a sequence of data blocks for permanently storing disk image data, and providing a disk cleaning process for transferring disk image data from the first disk image to the second disk image and deleting unused data blocks in the first and/or the second disk image.

16 Claims, 8 Drawing Sheets

(56) References Cited

U.S. PATENT DOCUMENTS

| | | | | |
|---|---|---|---|---|
| 8,346,727 | B1* | 1/2013 | Chester | G06F 17/30233 707/640 |
| 8,375,003 | B1* | 2/2013 | Afonso | G06F 11/1451 707/639 |
| 8,751,515 | B1* | 6/2014 | Xing | G06F 17/30073 707/755 |
| 8,850,146 | B1* | 9/2014 | Majumdar | G06F 12/08 707/649 |
| 2009/0240904 | A1* | 9/2009 | Austruy | G06F 11/1662 711/162 |
| 2011/0307657 | A1 | 12/2011 | Timashev et al. | |
| 2012/0016840 | A1 | 1/2012 | Lin et al. | |
| 2012/0265959 | A1 | 10/2012 | Le et al. | |
| 2012/0278799 | A1* | 11/2012 | Starks | G06F 9/455 718/1 |
| 2013/0036418 | A1* | 2/2013 | Yadappanavar | G06F 3/0611 718/1 |
| 2013/0054868 | A1* | 2/2013 | Bhattiprolu | G06F 9/5077 711/6 |
| 2016/0147607 | A1* | 5/2016 | Dornemann | G06F 11/1435 711/162 |
| 2016/0188353 | A1* | 6/2016 | Shu | G06F 9/45533 718/1 |

\* cited by examiner

VIRTUAL MACHINE DISK IMAGE BACKUP USING BLOCK ALLOCATION AREA

CROSS REFERENCE TO RELATED APPLICATION

This is a continuation of copending U.S. patent application Ser. No. 14/198,722, filed Mar. 6, 2014, entitled "Virtual Machine Image Disk Usage", which is herein incorporated by reference. This application claims priority under 35 U.S.C. §120 of U.S. patent application Ser. No. 14/198,722.

The present invention relates in general to data processing systems, and in particular, to a method, system and a computer program product for managing virtual machine image disk usage.

BACKGROUND

In cloud environments with virtual machines (VMs) running using a growable disk image, the size of this image increases over time. Usually, for shrinking the image, which means to reduce the space used on a storage device, the VM has to be shut down (or the disk has to be disconnected) or the VM user has to perform some actions. Currently, no technology is available which provides a method for shrinking an image on a disk at runtime without involvement of the VM operating system.

U.S. Pat. No. 7,647,468 B2 describes a method and mechanism for performing maintenance operations including compaction, de-fragmentation, and merging on a virtual storage device of a virtual machine. Architectures for computing devices and software allow a single computing device to run a plurality of partitions, each of which can be used to instantiate a virtual machine to in turn host an instance of an operating system. In such a computing device, a storage hardware device of the computing device such as a RAM memory or a hard disk drive memory may be dynamically assigned to a particular partition so that the particular partition can directly control such storage hardware device. Such particular partition, then, is in effect a host that provides storage capabilities as a storage host partition (SHP). Similarly, such SHP provides storage services to another partition which is in effect a client that consumes such capabilities as a storage client partition (SCP). Thus, the SCP and the SHP communicate to accomplish storage-related operations.

The virtual storage device of an SCP as well as the corresponding storage image file as maintained by the SHP might have a relatively large storage capacity. However, the storage capacity of the virtual storage device likely is not fully occupied by data, and instead may contain significant if not large amounts of empty space or space with null data and/or data no longer referenced therein.

Such null data in the virtual storage device need not be represented within the corresponding storage image file, at least on a byte-for-byte basis. By not storing null data from the virtual storage device in the corresponding storage image file, then, such storage image file may be stored on the storage hardware device as a smaller if not much smaller file.

In U.S. Pat. No. 7,647,468 B2 a method is described, which provides with regard to a computing device partitioned to include a host partition (HP) instantiated at least in part to provide storage capabilities, and also to include a client partition (CP) instantiated at least in part to consume such storage capabilities of the HP in the form of a virtual storage device at the CP. The HP implements the virtual storage device of the CP as an image file on a physical storage device. The method compacts the image file at the HP while the CP is employing the corresponding virtual storage device. The method compacts the image file on the HP while the CP is employing the corresponding virtual storage device. For this task, a direct communication with an entity in the CP is mandatory.

SUMMARY

In one embodiment, the invention provides a method for managing virtual machine image disk usage with improved efficiency and performance.

In another embodiment, the invention provides a system for managing virtual machine image disk usage with optimized efficiency and performance.

In yet another embodiment, the invention provides a computer program product for managing virtual machine image disk usage with optimized efficiency and performance.

These embodiments are achieved by the features of the independent claims. The other claims, the drawings and the specification disclose other embodiments of the invention.

According to a first aspect of the invention a method is proposed for managing virtual machine image disk usage comprising a disk image emulator for a virtual machine provided by a hypervisor, comprising the steps of providing at least a first disk image comprising a sequence of data blocks for accumulating write operations to the first disk image, providing at least a second disk image comprising a sequence of data blocks for permanently storing disk image data, and providing a disk cleaning process for transferring disk image data from the first disk image to the second disk image and deleting unused data blocks in the first and/or the second disk image.

An embodiment uses a state of the art copy-on-write (COW) technology doing changes of information on private copies of this information, as for example provided by a widely used disk emulating process like QEMU, to integrate a first disk image, serving as a "dirty" intermediate layer and which is used for accumulating ongoing writes, like cache flushes or for regular usage, while an asynchronous background process moves data blocks to a second disk image, serving as a "clean" backend layer. This second disk image serves as a target for cleaning processes as for example size reduction of disk partitions or the like. These cleaning processes can be asynchronous and continuous move/scrub processes. They interpret a file system where the disk images are managed, find empty data blocks, move used data blocks to the second disk image, update references and free unused space in the first and second disk image.

An advantage is that all these steps can be done while the VM is running and without having the VM to be aware of this action. It can be done at any time; for example, when certain rules apply, such as disk/CPU/network utilization or the like, and therefore has a minimum impact on the user experience. Furthermore, data consistency can be guaranteed, as ongoing write processes could not get lost; they are still written to the first disk image.

Another advantage against the state of the art, which still requires support by the VM and usage of a "block allocation table", is that according to an embodiment of the invention information is retrieved by scanning a file system itself.

The following advantages may be appreciated. An embodiment is based on the fact that a hypervisor and a disk emulator are completely separated and working independently. But this is not mandatory, in another embodiment the disk emulator could also be implemented in the hypervisor. Using a copy-on-write process enables to perform the method in an asynchronous manner. The command for shrinking a disk image need not be triggered from a user, but may be initiated by the disk emulator, where the disk emulator may be triggered by the hypervisor or some automatic rules taking into account system usage, for example. Data consistency may be observed even during the shrinking process and shrinking may be performed online and/or offline. Implementation of the method on a system may be achieved in a transparent way for the hypervisor, and may be performed completely in a disk emulator. No communication with a client partition is needed, as there is no support from a client file system needed.

By this way the described method for managing virtual machine image disk usage may be performed with improved efficiency and performance compared to state of the art processes in virtual machine environments.

In an embodiment of the invention the disk cleaning process in an initialization phase may comprise the steps of (i) identifying at least a file system managing the first disk image and the second disk image; (ii) for each used data block in the first disk image copying the used data block to the second disk image, updating a reference of this used data block in the first disk image; (iii) for each data block in the first disk image being still used copying the data block to a block allocation area in the second image, updating a reference of this data block in the first disk image, if the block allocation area of the first image does not contain any further used data blocks, freeing the rest of the block allocation area. The analysis of the block allocation area as well as the freeing process should be performed as an atomic operation, in order to do not overlap with concurrent writing processes. The initialization phase serves for starting the management process for virtual machine image disk usage. During this phase the first and the second disk images are initialized, first used data blocks are written from the first to the second disk image and then the first disk image is shrunk for the unused data blocks. This represents an efficient way to start the whole management process.

Proceeding then to a continuous phase of the management process the disk cleaning process may comprise the steps of (i) identifying at least a file system managing the first disk image and the second disk image; (ii) for each data block in the first disk image, updating content and usage state of this data block in the second disk image; (iii) for each data block in the first disk image being still used, copying the data block to a block allocation area in the second image, updating a reference of this data block in the first disk image, if the block allocation area of the first image does not contain any further used data blocks, freeing the rest of the block allocation area; (iv) for each data block in the second disk image being still used, copying the data block to a block allocation area, updating a reference of this data block in the second disk image, if the block allocation area does not contain any further used data blocks, freeing the rest of the block allocation area. Again, the analysis and defragmentation of the block allocation areas as well as the freeing process should be performed as an atomic operation, in order to do not overlap with concurrent writing processes. Proceeding to a continuous phase data blocks in the first image may also be deleted which were in use before and which have already been written to the second disk image. This means that the information about the current status of data blocks has always to be updated also in the second disk image in order to mark data blocks there to be deleted too if they are deleted in the current process. This process is carried out in the continuous phase of the disk cleaning process and leads to improved efficiency and performance of the whole system.

The disk cleaning process may be configured as an asynchronous background process on hypervisor level. This means that shrinking of the disk images for reduction of disk space used by virtual machines can be performed at runtime of the system without being visible to the user and without need for interaction of the user.

The disk cleaning process may be configured as a continuous process while a virtual machine is running, which is a very efficient way of performing such shrinking processes. Thus, it is guaranteed that the system keeps its efficiency with a high probability as the disk space reduction is an ongoing process.

In an embodiment the disk cleaning process may be performed by the hypervisor or on hypervisor level without control of the virtual machine. Thus, the performance of the virtual machine is not disturbed, the system keeps running all the time and the shrinking processes may run asynchronously in the background.

The disk cleaning process may include analyzing file system meta data information for the automated global shrinking process of the disk images. The advantage is that the file system meta data, such as an inode in a UNIX-based system, contain all the relevant information for retrieving data, copying or updating references or the like and this analysis can be performed by the disk cleaning process without disturbing the running behavior of the virtual machine itself.

The method may be implemented using a copy-on-write process (COW), which is a very common state of the art process. Copy-on-write stems from the understanding that when multiple separate tasks use identical copies of the same information (i.e., data stored in computer memory or disk storage), it is not necessary to create separate copies of that information for each process, instead they can all be given pointers to the same resource. When there are many separate processes all using the same resource it is possible to make significant resource savings by sharing resources this way. In one embodiment of the present invention uses only one first image attributed to a second image, but principally it is possible to use more than one first image attributed to a second image. In this case the disk cleaning process should have the knowledge on all first images.

In an embodiment of the invention the method may be implemented using a block usage map. This block usage map may serve as a very efficient tool for storing and retrieving all the relevant information in a centralized manner about updates, storage location, synchronization information of data blocks involved in the management process for image disk usage.

According to a further aspect of the invention a data processing program for execution in a data processing system is proposed comprising an implementation of an instruction set for performing a method as described above when the data processing program is run on a computer.

Further, a computer program product is proposed comprising a computer usable medium including a computer readable program, wherein the computer readable program when executed on a computer causes the computer to perform a method for managing virtual machine image disk usage comprising a disk image emulator for a virtual machine provided by a hypervisor, comprising at least a first disk image comprising a sequence of data blocks for accumulating write operations to the first disk image, at least a second disk image comprising a sequence of data blocks for permanently storing disk image data, and a disk cleaning process for transferring disk image data from the first disk image to the second disk image and deleting unused data blocks in the first and/or the second disk image.

As will be appreciated by one skilled in the art, aspects of the invention may be embodied as a system, method or computer program product. Accordingly, aspects of the invention may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, aspects of the invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be; for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the invention are described below with reference to block diagrams of methods, apparatus (systems) and computer program products according to embodiments of the invention. It will be understood that each block of the flowchart illustrations and/or block diagrams, and combinations of blocks in the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block or blocks.

Due to a further aspect of the invention, a data processing system for execution of a data processing program is proposed, comprising software code portions for performing a method described above.

BRIEF DESCRIPTION OF THE SEVERAL VIEWS OF THE DRAWINGS

The invention may best be understood from the following detailed description of the embodiments, but not restricted to the embodiments, wherein is shown in.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1:
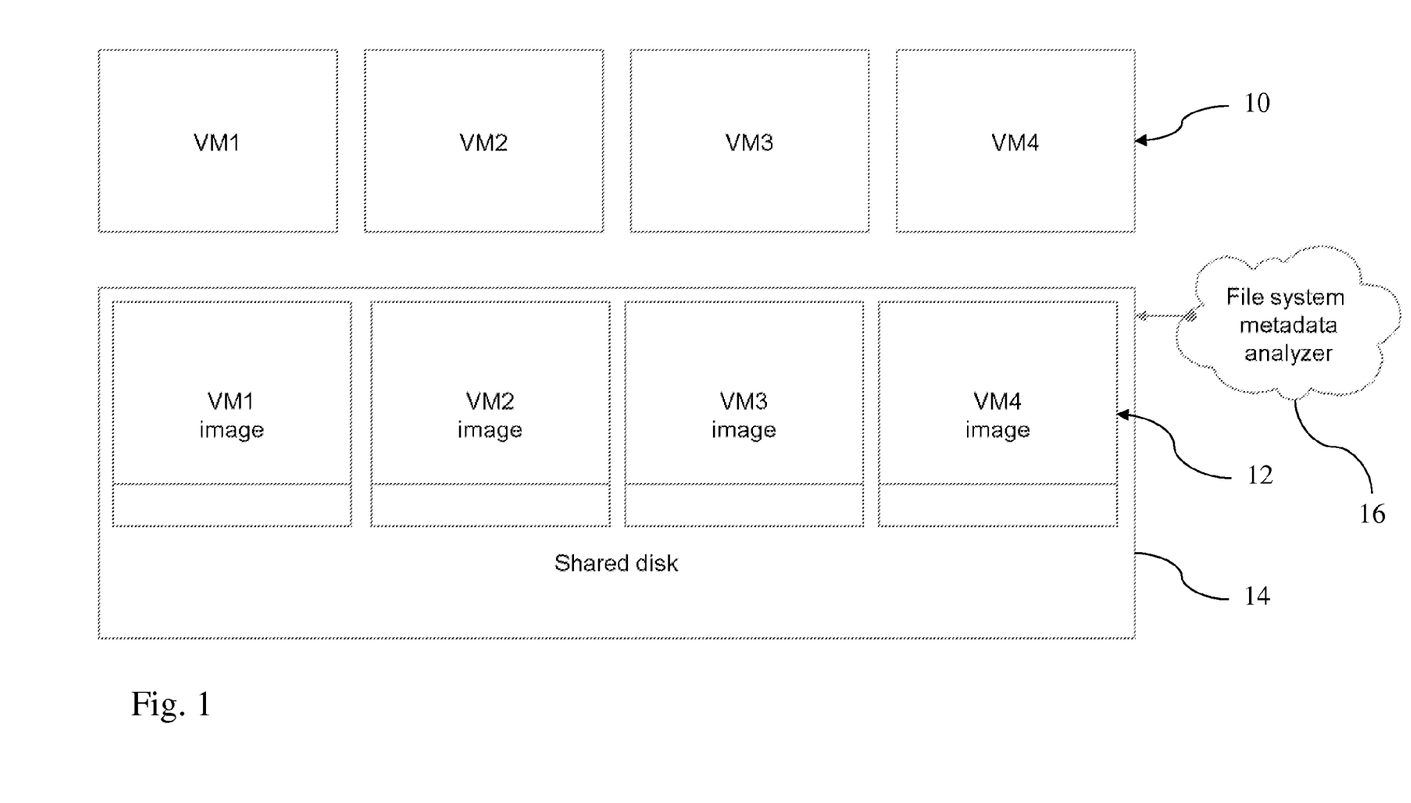
FIG. 1 an approach for managing disk usage of VM images by analyzing inode information according to an embodiment of the invention.

In FIG. 1 an approach for managing disk usage of VM images 12 by analyzing inode information according to an embodiment of the invention is shown. There are depicted a number of virtual machines 10, VM1 to VM4, as well as their corresponding VM images 12, residing on a shared disk 14. The VM images are able to retrieve file system metadata information, such as inode information in a UNIX-system, from a file system metadata analyzer 16 in order to control a managing process for disk usage by the VM images.

Figure 2:
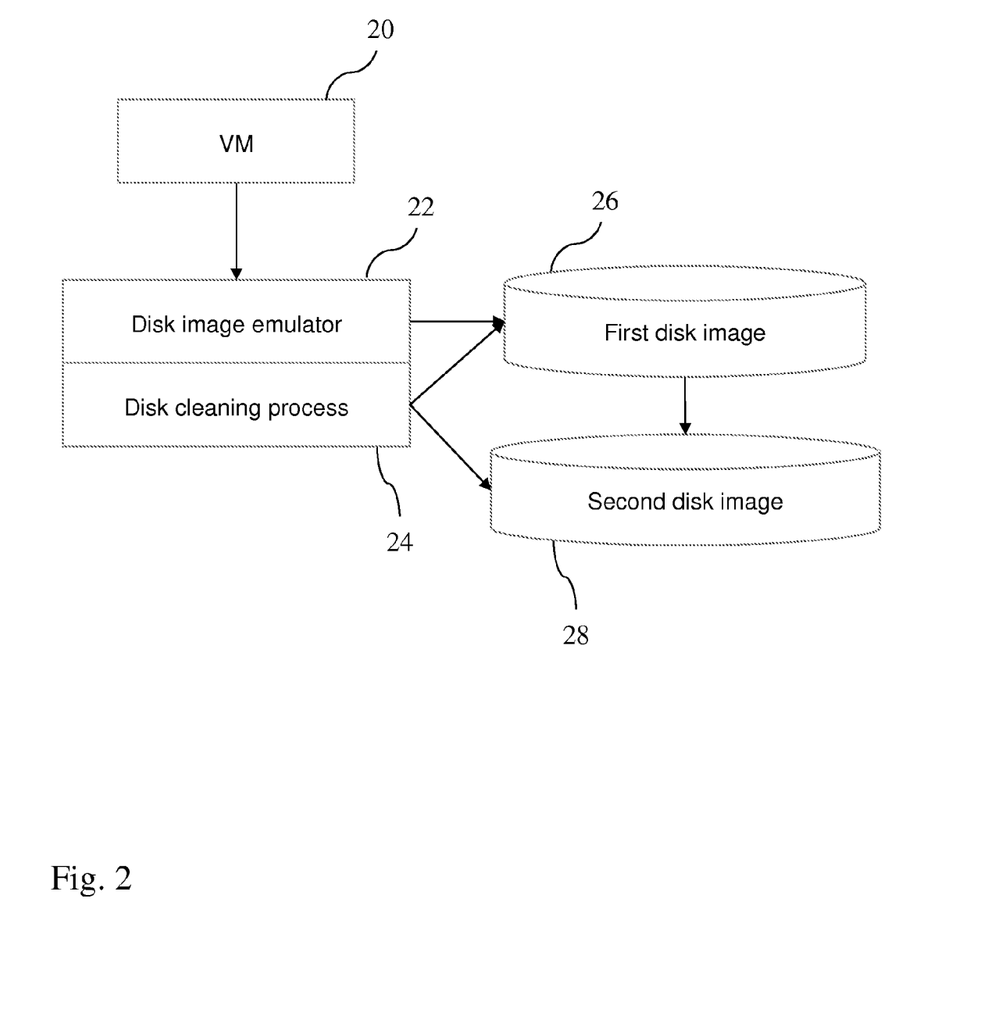
FIG. 2 a proposed system structure for managing virtual machine image disk usage according to an embodiment of the invention.

FIG. 2 shows a proposed system structure for managing virtual machine image disk usage according to an embodiment of the invention. The described method comprises a disk image emulator 22 for a virtual machine 20 provided by a hypervisor 30, comprising at least a first disk image 26 comprising a sequence of data blocks for accumulating write operations to the first disk image 26, at least a second disk image 28 comprising a sequence of data blocks for permanently storing disk image data, and a disk cleaning process 24 for transferring disk image data from the first disk image 26 to the second disk image 28 and deleting unused data blocks in the first and/or the second disk image 26, 28.

The disk cleaning process 24 in an initialization phase comprises the steps of (i) identifying at least a file system managing the first disk image 26 and the second disk image 28; (ii) for each used data block in the first disk image 26 copying the used data block to the second disk image 28, updating a reference of this used data block in the first disk image 26; (iii) for each data block in the first disk image 26 being still used copying the data block to a block allocation area, updating a reference of this data block in the first disk image 26, if the block allocation area does not contain any further used data blocks, freeing the rest of the block allocation area.

The disk cleaning process 24 in a continuous phase comprises the steps of (i) identifying at least a file system managing the first disk image 26 and the second disk image 28; (ii) for each data block in the first disk image 26 updating content and usage state of this data block in the second disk image 28; (iii) for each data block in the first disk image 26 being still used copying the data block to a block allocation area, updating a reference of this data block in the first disk image 26, if the block allocation area does not contain any further used data blocks, freeing the rest of the block allocation area; (iv) for each data block in the second disk image 28 being still used copying the data block to a block allocation area, updating a reference of this data block in the second disk image 28, if the block allocation area does not contain any further used data blocks, freeing the rest of the block allocation area.

The disk cleaning process 24 is configured as an asynchronous background process, as well as it is running continuously during virtual machine 20 running and without interaction from the user.

Figure 3:
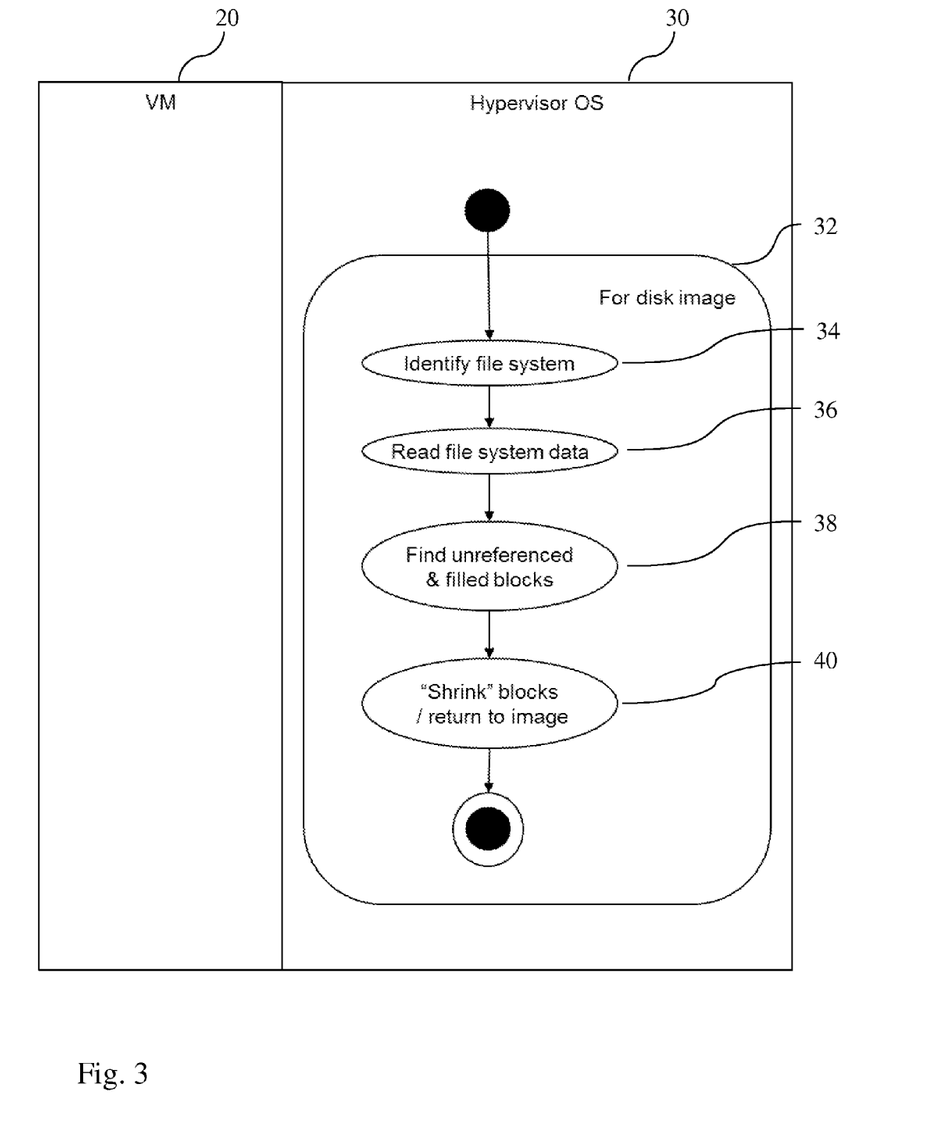
FIG. 3 an overview of a method for managing virtual machine image disk usage according to an embodiment of the invention.

FIG. 3 depicts an overview of a method for managing virtual machine image disk usage according to an embodiment of the invention, where a disk cleaning process 24 is performed by a hypervisor 30 or on hypervisor level without control of a virtual machine 20. The general overview of the method shows that in process 32 for each disk image, first a file system is identified, step 34, then file system data are read, step 36, unreferenced and still filled data blocks are identified, step 38, and finally these data blocks are set empty or shrunk and returned to an image. The method is implemented using a copy-on-write process, which means that the method is able to work completely in an asynchronous manner.

Figure 4:
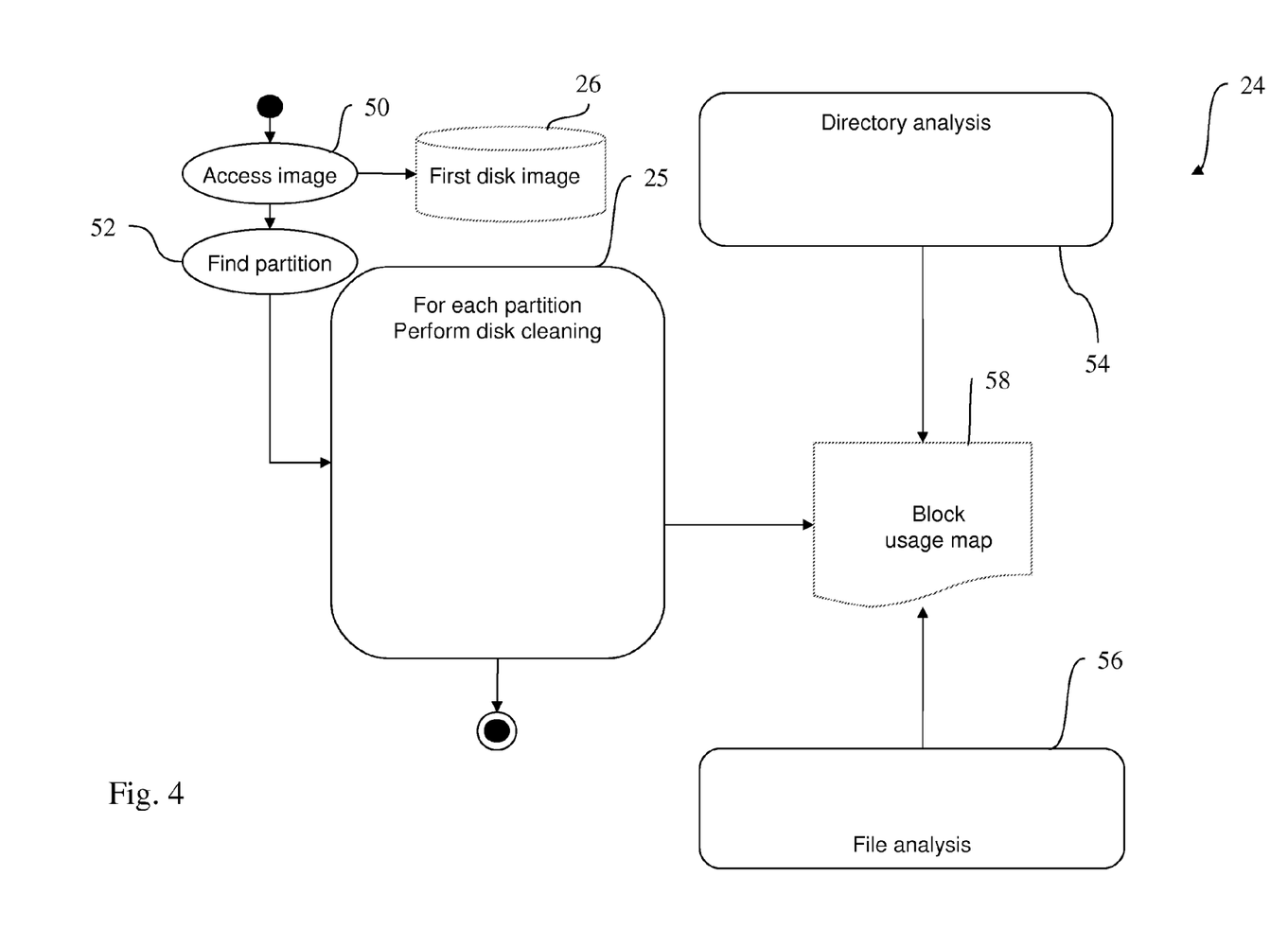
FIG. 4 an overview of a disk cleaning process according to an embodiment of the invention.

FIG. 4 gives an overview of a disk cleaning process 24 according to an embodiment of the invention. A first disk image is accessed, step 50, available partitions found, step 52, and with this information a central subprocess 25 of the disk cleaning process 24 started. This subprocess 25, which is carried out for each available partition, uses a block usage map 58 as a central information source for controlling the activities. In this block usage map 58 all relevant information from analyzing processes concerning directory activities, step 54, and file activities, step 56, as well as from subprocess 25 are gathered and stored for further usage.

Figure 5:
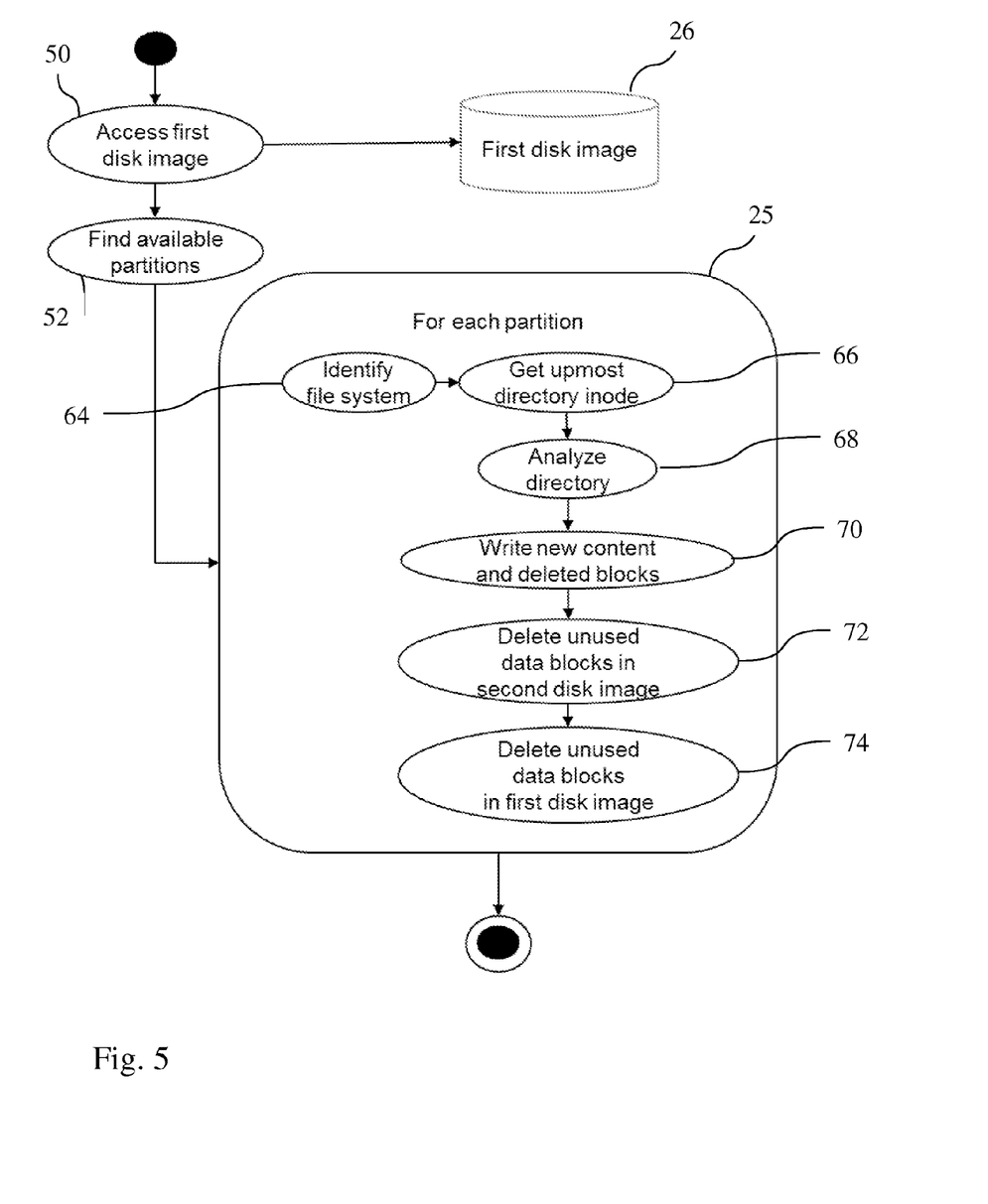
FIG. 5 a central subprocess of a disk cleaning process according to an embodiment of the invention.

In FIG. 5 the central subprocess 25 of a disk cleaning process according to an embodiment of the invention is explained in more detail. First, in subprocess 25, a file system is identified, step 64, which leads to getting an upmost directory inode, step 66, where all relevant information about a partition is retrievable. The directory is analyzed, step 68, new information from a write operation as well as about deleted data blocks is transferred, step 70, and then unused data blocks shrunk in the second disk image, step 72, as well as in the first disk image, step 74, serving as an intermediate layer.

Figure 6:
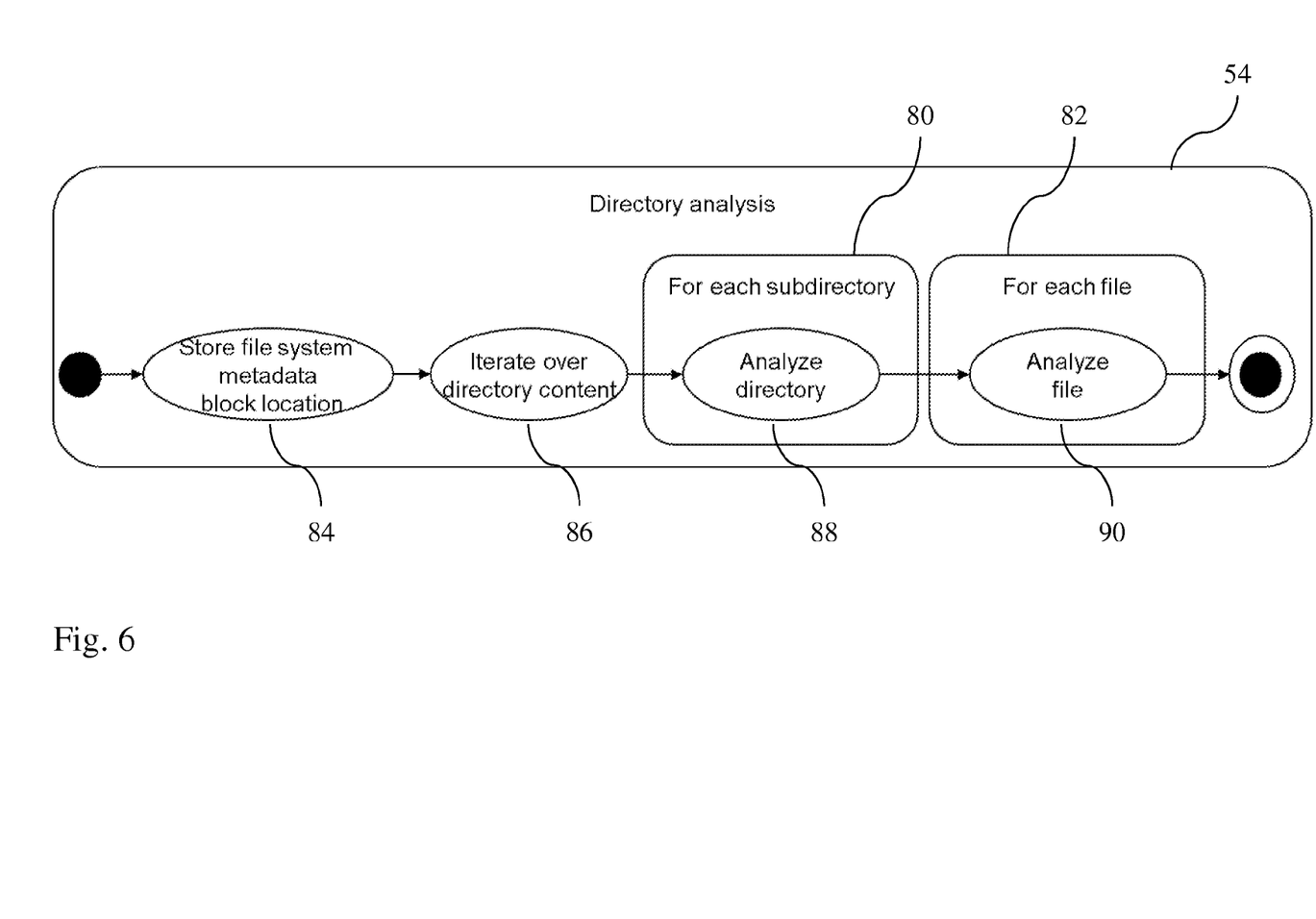
FIG. 6 a directory analysis subprocess of a disk cleaning process according to FIG. 4.

In FIG. 6 the directory analysis subprocess 54 of a disk cleaning process according to FIG. 4 is explained in detail. First, file system metadata information, such as inode information in a Unix-based system, about data block location is stored in the block usage map, step 84, which is iterated over the content of a directory, step 86. Then for each subdirectory, subprocess 80, the directory is analyzed, step 88, and following for each file entry, subprocess 82, files are analyzed, step 90.

Figure 7:
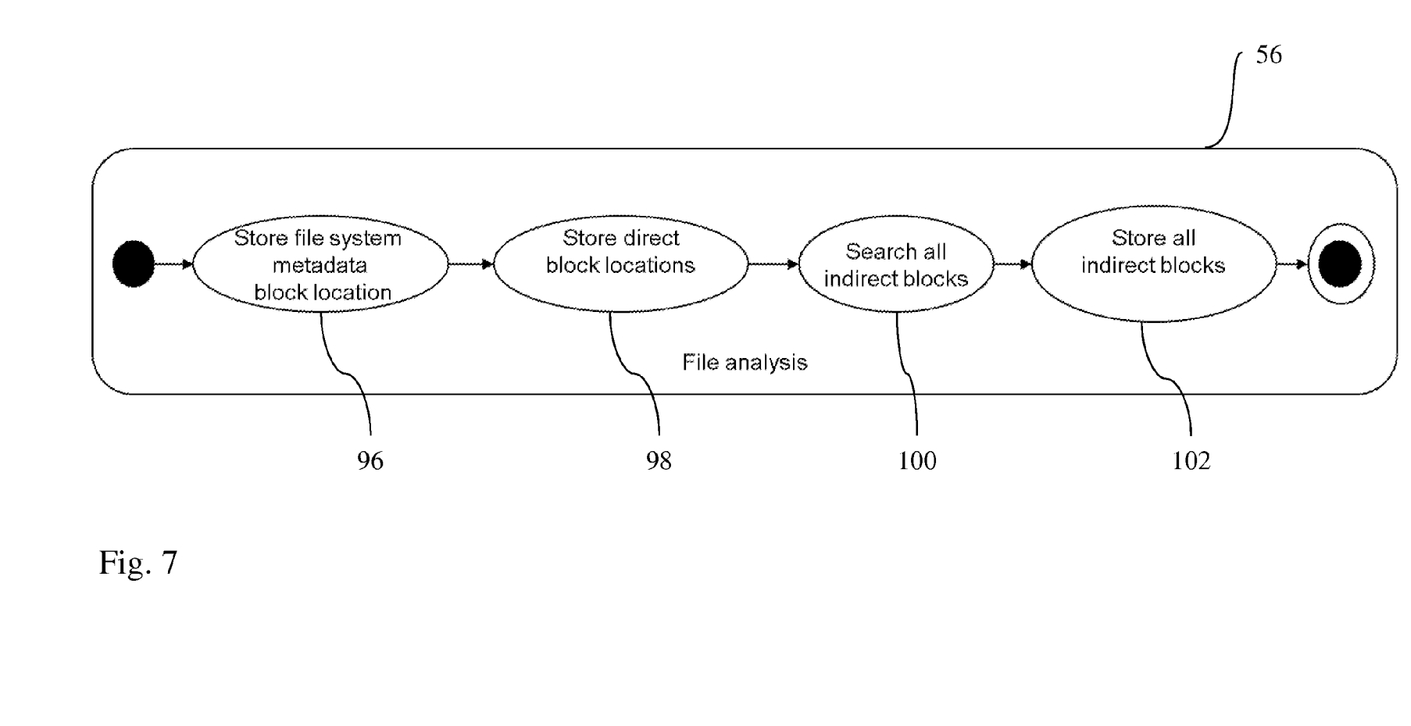
FIG. 7 a file analysis subprocess of a disk cleaning process according to FIG. 4.

Finally in FIG. 7 the file analysis subprocess 56 of a disk cleaning process according to FIG. 4 is explained in detail. This subprocess 56 serves also for updating the block usage map. It starts with storing file system metadata information about data block location in the block usage map, step 96, proceeds to store direct data block locations in the block usage map, step 98. Then a search for all indirect data blocks is performed, step 100, and all indirect data blocks stored in the block usage map, step 102.

Thus, the block usage map contains all information about updates in the first disk image, information about contents of the first disk image, as well as information about synchronization processes to the second disk image.

Figure 8:
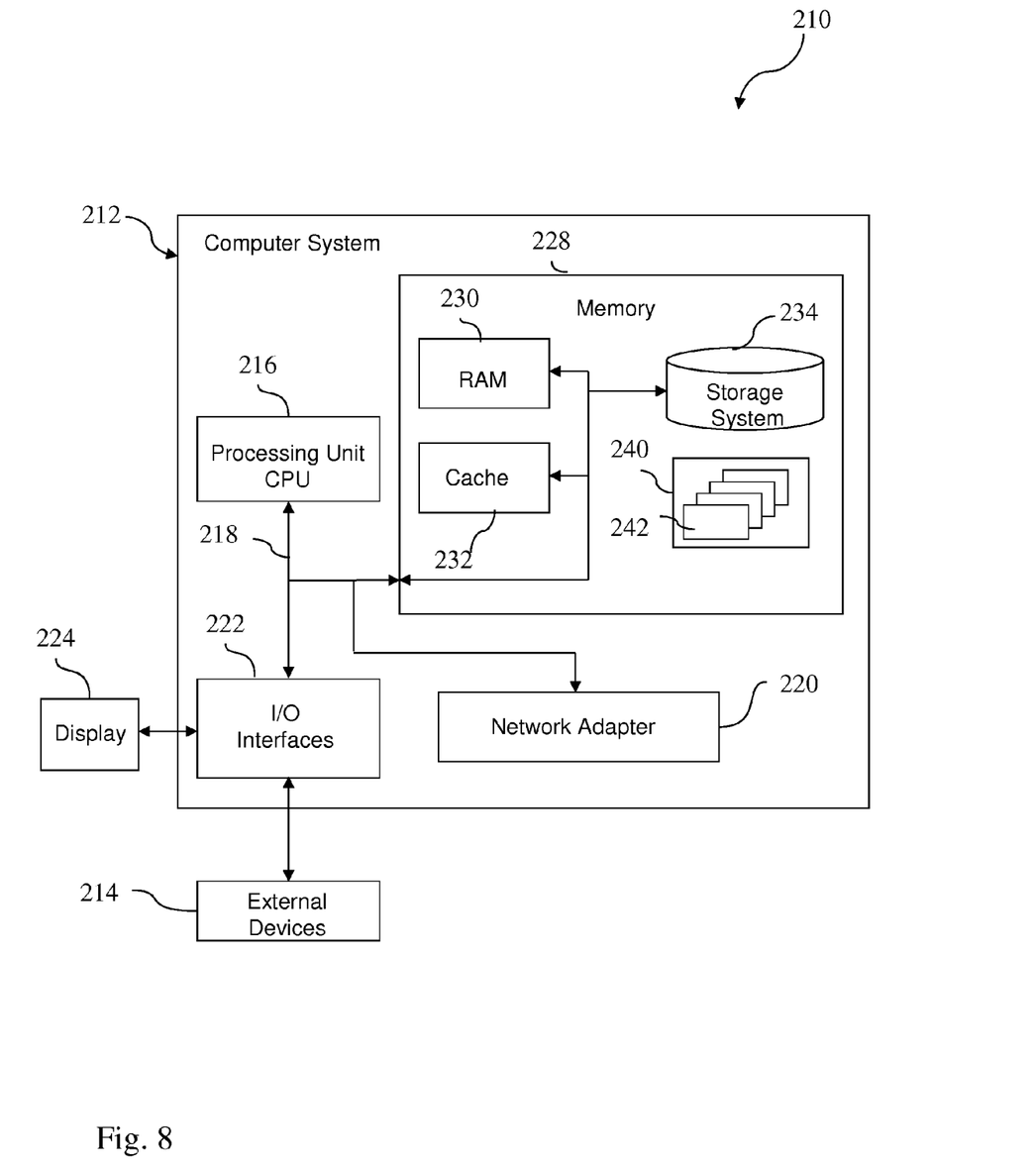
FIG. 8 an example embodiment of a data processing system for carrying out a method according to the invention.

Referring now to FIG. 8, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein. Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples include, but are not limited to: microcode, device drivers, redundant processing units, external disk drive arrays, RAID systems, tape drives, and data archival storage systems, etc.

The block diagrams in the figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The invention claimed is:

1. A computer program product for managing a virtual machine image disk usage, the computer program product comprising a non-transitory computer readable storage medium having program instructions embodied therewith, the program instructions executable by a computer to cause the computer to perform a method comprising:
   providing at least a first disk image comprising a sequence of data blocks for accumulating write operations to the first disk image;
   providing at least a second disk image comprising a sequence of data blocks for permanently storing disk image data; and
   providing a disk cleaning process for transferring disk image data from the first disk image to the second disk image and deleting unused data blocks in at least one of the first and the second disk image;
   wherein the disk cleaning process in an initialization phase comprises:
      identifying at least a file system managing the first disk image and the second disk image;
      for each used data block in the first disk image,
         copying the used data block to the second disk image;
         updating a reference of this used data block in the first disk image;

for each data block in the first disk image being still used,
  copying the data block to a block allocation area in the second image;
  updating a reference of this data block in the first disk image;
  if the block allocation area of the first image does not contain any further used data blocks, freeing the rest of the block allocation area.

2. The computer program product according to claim 1, wherein the disk cleaning process in a continuous phase comprises:
  identifying at least a file system managing the first disk image and the second disk image;
  for each data block in the first disk image,
    updating content and usage state of this data block in the second disk image;
  for each data block in the first disk image being still used,
    copying the data block to a block allocation area in the second image;
    updating a reference of this data block in the first disk image;
    if the block allocation area of the first image does not contain any further used data blocks, freeing the rest of the block allocation area;
  for each data block in the second disk image being still used,
    copying the data block to a block allocation area;
    updating a reference of this data block in the second disk image;
    if the block allocation area does not contain any further used data blocks, freeing the rest of the block allocation area.

3. The computer program product according to claim 1, wherein the disk cleaning process is configured as an asynchronous background process on hypervisor level.

4. The computer program product according to claim 1, wherein the disk cleaning process is configured as a continuous process while the virtual machine is running.

5. The computer program product according to claim 1, wherein the disk cleaning process is performed by the hypervisor or on hypervisor level without control of the virtual machine.

6. The computer program product according to claim 1, wherein the disk cleaning process includes analyzing file system meta data information.

7. The computer program product according to claim 1, wherein the method is implemented using a copy-on-write process.

8. The computer program product according to claim 1, wherein the method is implemented using a block usage map.

9. A data processing system, comprising:
  at least one processor;
  a memory communicatively coupled to the at least one processing unit;
  a disk image manager embodied as instructions storable in the memory and executable by the at least one processing unit, the disk image manager performing a method comprising:
  providing at least a first disk image comprising a sequence of data blocks for accumulating write operations to the first disk image;
  providing at least a second disk image comprising a sequence of data blocks for permanently storing disk image data; and
  providing a disk cleaning process for transferring disk image data from the first disk image to the second disk image and deleting unused data blocks in at least one of the first and the second disk image;
  wherein the disk cleaning process in an initialization phase comprises:
    identifying at least a file system managing the first disk image and the second disk image;
    for each used data block in the first disk image,
      copying the used data block to the second disk image;
      updating a reference of this used data block in the first disk image;
    for each data block in the first disk image being still used,
      copying the data block to a block allocation area in the second image;
      updating a reference of this data block in the first disk image;
      if the block allocation area of the first image does not contain any further used data blocks, freeing the rest of the block allocation area.

10. A computer program product for managing a virtual machine image disk usage, the computer program product comprising a non-transitory computer readable storage medium having program instructions embodied therewith, the program instructions executable by a computer to cause the computer to perform a method comprising:
  providing at least a first disk image comprising a sequence of data blocks for accumulating write operations to the first disk image;
  providing at least a second disk image comprising a sequence of data blocks for permanently storing disk image data; and
  providing a disk cleaning process for transferring disk image data from the first disk image to the second disk image and deleting unused data blocks in at least one of the first and the second disk image;
  wherein the disk cleaning process in a continuous phase comprises:
    identifying at least a file system managing the first disk image and the second disk image;
    for each data block in the first disk image,
      updating content and usage state of this data block in the second disk image;
    for each data block in the first disk image being still used,
      copying the data block to a block allocation area in the second image;
      updating a reference of this data block in the first disk image;
      if the block allocation area of the first image does not contain any further used data blocks, freeing the rest of the block allocation area;
    for each data block in the second disk image being still used,
      copying the data block to a block allocation area;
      updating a reference of this data block in the second disk image;
      if the block allocation area does not contain any further used data blocks, freeing the rest of the block allocation area.

11. The computer program product according to claim 10, wherein the disk cleaning process is configured as an asynchronous background process on hypervisor level.

12. The computer program product according to claim 10, wherein the disk cleaning process is configured as a continuous process while the virtual machine is running.

13. The computer program product according to claim 10, wherein the disk cleaning process is performed by the hypervisor or on hypervisor level without control of the virtual machine.

14. The computer program product according to claim 10, wherein the disk cleaning process includes analyzing file system meta data information.

15. The computer program product according to claim 10, wherein the method is implemented using a copy-on-write process.

16. The computer program product according to claim 10, wherein the method is implemented using a block usage map.

* * * * *